United States Patent Office 3,281,271
Patented Oct. 25, 1966

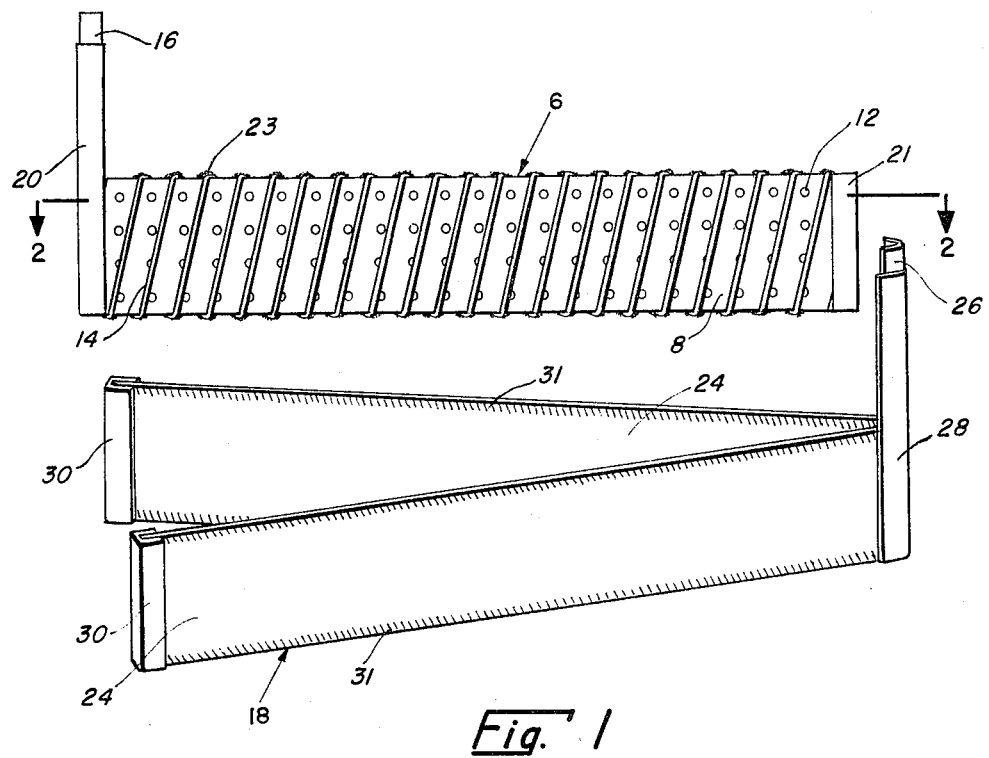
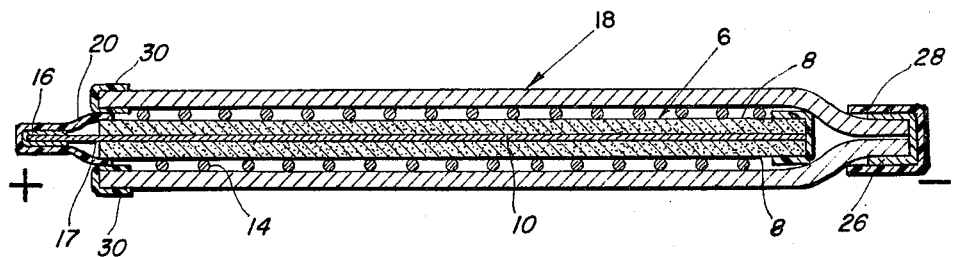
Fig. 1
Fig. 2
INVENTORS:
MILTON COMANOR
CHARLES M. GOLD
BY
Irving Holtzman
ATTORNEY

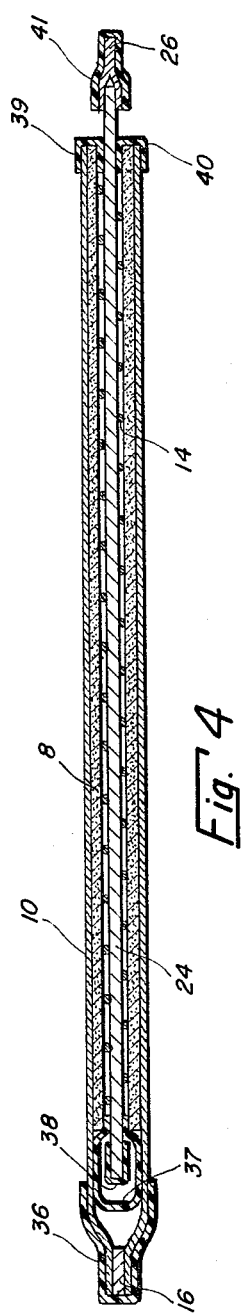
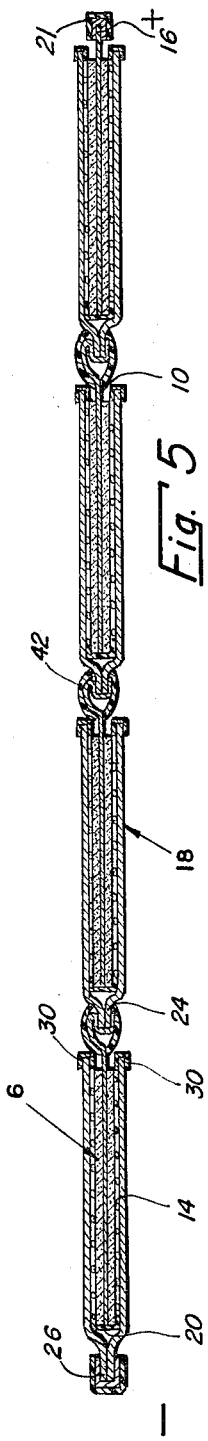
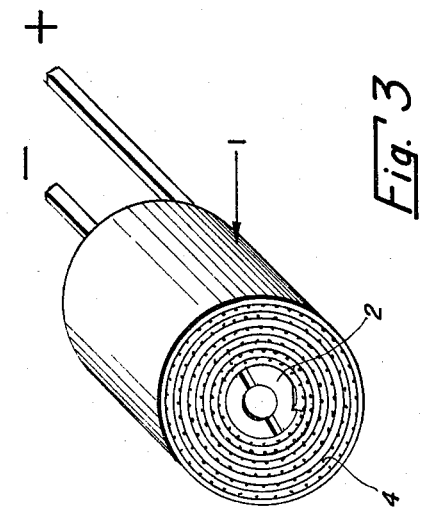

3,281,271
ELECTRODE ASSEMBLY FOR ELECTROCHEMICAL DEVICE HAVING WOUND FILAMENTARY SPACING MEANS ARRANGED IN A SPIRAL
Milton Comanor, Queens, and Charles M. Gold, Franklin Square, N.Y., assignors to Yardney International Corp., New York, N.Y., a corporation of New York
Filed May 2, 1962, Ser. No. 191,829
1 Claim. (Cl. 136—13)

This invention relates to deferred-action electrochemical devices and, more particularly, to deferred-action batteries. It has special application to core-wound batteries which can be activated by immersion in salt water, fresh water or other electrolyte.

It has been suggested in the prior art that a deferred-action battery of the immersion type could be made by forming a stack consisting of (1) a central strip of magnesium, (2) a pair of sheet separators on each side of the magnesium strip, and (3) a strip of rolled fused silver chloride on each side of the stack. The stack so formed is then wound around a central core. In use, however, batteries having this construction proved unsatisfactory. They exhibited short life, fast voltage drop on discharge, erratic voltage on discharge, and overvoltage out of specification. Furthermore, these batteries were difficult to manufacture and were easily shorted.

It has now been found that the above-mentioned disadvantages in the performance of core-wound batteries can be eliminated if spacer means are provided between the electrodes of the battery which permit free flow of liquid therebetween.

The free flow of electrolyte between the electrodes of the present invention sweeps clean any sludge which tends to form between them. This results in good utilization of active material even at high discharge rates.

It has further been found, in accordance with the present invention, that the performance of batteries of the type mentioned above may be improved by including in the battery a silver-chloride electrode assembly wherein at least one sheet of silver chloride is hot-forged to a sheet of silver foil. It has also been found that better utilization of the silver chloride in the above-mentioned batteries may be effected by sandwiching the silver-chloride electrode assembly between the magnesium strips.

It is accordingly an object of the present invention to provide electrochemical devices of the above-mentioned type with improved performance characteristics.

It is another object of this invention to provide improved electrodes suitable for use in electrochemical devices of the type mentioned above.

It is a further object of the instant invention to provide improved electrode packs for electrochemical devices of the above-mentioned type.

It is still a further object of the present invention to provide an improved method for manufacturing components for the electrochemical device mentioned above.

It is, moreover, an object of this invention to provide devices for carrying out the above-mentioned method.

Other and more detailed objects of this invention will be apparent from the following description and the accompanying drawings wherein:

FIG. 1 is an exploded view of an electrode assembly embodying the present invention;

FIG. 2 is a cross-sectional view of the electrode assembly shown in FIG. 1, after assembly, taken along line 2—2' thereof;

FIG. 3 is a perspective view of an assembled battery embodying the present invention;

FIG. 4 is a cross-sectional view similar to that shown in FIG. 2 of another embodiment of this invention;

FIG. 5 is a cross-sectional view similar to that shown in FIG. 2 of a battery comprising four cells connected in series prior to winding on a core.

In the drawings wherein the same numerals designate the same structure in the various views, an assembled battery of the immersion type is shown at 1 in FIG. 3. It comprises a hollow cylindrical core 2 (e.g. of wood) around which the electrodes are wound. The electrodes are spaced from each other by equidistant spacer filaments 4, described in more detail below. These spacers maintain the electrodes separated from each other and provide channels through which the electrolyte (e.g. sea water) may flow freely.

The electrode assembly, prior to winding on core 2, is best shown in FIGS. 1 and 2. Numeral 6 designates a silver-chloride electrode assembly which consists of a pair of silver-chloride strips 8 between which is sandwiched a strip of silver foil 10. The silver-chloride strip is preferably made from fused silver chloride which has been rolled out into sheets and then cut into strips. In the preferred form of this invention, the silver-chloride strips are hot-forged to the silver foil by hot pressing at temperatures of about 450° F. to 550° F.

The thickness of the silver-chloride strip or the silver foil may vary depending on the particular requirements of the battery. A suitable electrode may be made from silver chloride having a thickness of 8 mils and silver foil of 1-mil thickness. It is also preferred that the silver-chloride strip be provided with perforations 12. If desired, the silver-chloride strips 8, before use, may be subjected to a development treatment which will provide their surfaces with a thin coating of metallic silver.

As noted above, the electrodes of opposite polarity are maintained separated from each other by spacer means adapted to allow the free flow of electrolyte therebetween. In the preferred form of this invention, the spacer means takes the form of spaced turns of a winding 14 of filamentary material which are tautly wound around the silver-chloride electrode assembly 6. The turns are uniformly spaced so as to provide clear paths between them through which electrolyte may readily flow. The uniform winding also provides uniform distances between the electrodes which makes it possible to standardize the electrical performance of the battery. Different spacings between windings of the spacer material may be selected. It has been found, however, that excellent results are obtained when the turns are maintained 5/32 inch apart.

A variety of filamentary materials are suitable for use as spacers in accordance with the present invention. However, it has been found that the best performance is obtained with filamentary materials which are permeable to and readily wetted by electrolyte. A materials which is eminently suitable for this purpose is cotton thread. The particular cross-sectional diameter of the thread is not of great moment. Cotton thread having a cross-sectional diameter of 15 mils has been found to be satisfactory.

Silver-chloride electrode assembly 6 is provided with a terminal tab 16 which is secured to an extension 17 of the silver-foil strip 10. The terminal tab 16 may take the form of a silver-foil strip which is folded in a U and welded to the extension 17.

To insulate the silver-chloride electrode assembly 6 along its edges from the magnesium electrode assembly 18, described in detail below, the former is provided with insulating tape coverings 20 and 21. The portions of the filamentary material 14 that lie over the edges of the silver-chloride electrode assembly 6 are provided with dabs of paint 23 which serve to cement the filamentary material to the electrode assembly 6.

The magnesium electrode assembly 18 consists of a pair of magnesium strips 24 which are secured at one end to a silver terminal tab 26. Terminal tab 26 is covered over with insulating tape 28. The edges of magnesium strips 24 that are remote from terminal tab 26 are likewise provided with insulating tape 30 whereas the upper and lower edges are provided with a paint coating 31. The thickness of the magnesium strips 24 will also vary depending on the needs of the battery. However, a thickness of 11 mils is quite suitable for most applications.

In assembly the embodiment of the invention shown in FIGS. 1 and 2, which incidentally is a single cell battery, the silver chloride electrode assembly 6 is placed between the magnesium strips 24 of the magnesium electrode assembly 18. The relationships of the parts in the assembled condition is shown in FIG. 2. The assembly in this condition is then wound around core 2 and the ends are taped to prevent the unwinding of the rolled assembly.

In the modification shown in FIG. 4, the silver-chloride electrode assembly includes a strip of silver foil 10 to which has been hot-forged only a single strip 8 of silver-chloride. In this case, a strip of magnesium 24 is sandwiched between two such silver-chloride electrodes. Furthermore, in this embodiment, the spacer filamentary material 14 is wounded around the magnesium strip 24. Moreover, the respective electrode assemblies are appropriately insulated from each other by insulating tape strips 36, 37, 38, 39, and 40. This embodiment is likewise provided with silver foil terminal tabs 16 and 26 which are also covered with insulating tape strips 36 and 41.

The embodiment of this invention illustrated diagrammatically in FIG. 5 represents four cells (of the same construction as shown in FIGS. 1 and 2) connected in series. As in FIG. 2, the silver-chloride electrode assembly 6 in each cell is sandwiched between the arms of the magnesium electrode assembly 18. The electrodes of opposite polarity in any one cell are insulated from each other by insulating tapes 30 and 20. However, the silver chloride electrode assembly 6 of a previous cell in the series is electrically connected to the magnesium electrode assembly 18 of the next cell of the series in any suitable fashion. In the embodiment illustrated, an extension of the silver foil strip 10 is folded back to form a U-shaped fold which receives the ends of the magnesium strips 24 of the next cell in the series. These are all taped together by means of insulating-tape strips 42.

After the cells have been assembled in series as shown in FIG. 5, the assembly is wound around a wooden cylindrical core similar to that shown in FIG. 2. The winding is then taped to prevent the unraveling of the battery.

Whereas the invention has been described with reference to specific forms thereof, it will be understood that many changes and modifications may be made without departing from the spirit and scope of the appended claim.

What is claimed is:

An electrode assembly for an electrochemical cell, comprising an inner electrode in the form of an elongated first strip consisting essentially of a conductive foil and electrochemically active silver-chloride layers hot-forged onto opposite sides of said foil; a pair of second electrode strips of magnesium substantially coextensive with said first strip on opposite sides thereof and directly juxtaposed with said layers, respectively; a thread of electrolyte-wettable filamentary insulating material wound in spaced-apart turns about said first strip and constituting essentially the sole separating spacing means between said first and second electrode strips, said insulating material being bonded to said first strip, said strip sandwiching said turns between them to form an elongated structure; a core about which said elongated structure is spirally wound; first terminal means on one end of said structure conductively connected with said first strip; and second terminal means on the other end of said structure conductively connected with said second strips.

References Cited by the Examiner

UNITED STATES PATENTS

| | | | |
|---|---|---|---|
| 1,861,096 | 5/1932 | Schlaepfer | 136—1 |
| 2,661,388 | 12/1953 | Warner et al. | 136—100 |
| 2,970,181 | 1/1961 | Corren | 136—146 |
| 3,005,864 | 10/1961 | Sharpe | 136—100 |

WINSTON A. DOUGLAS, *Primary Examiner.*

JOHN R. SPECK, MURRAY TILLMAN, *Examiners.*

H. FEELEY, B. J. OHLENDORF, *Assistant Examiners.*